United States Patent
Guo et al.

(10) Patent No.: US 12,206,105 B2
(45) Date of Patent: Jan. 21, 2025

(54) POSITIVE ELECTRODE MATERIAL FOR HIGH-POWER LITHIUM ION BATTERY AND PREPARATION METHOD THEREOF

(71) Applicants: Minmetals New Energy Materials(Hunan) Co., Ltd., Hunan (CN); JINCHI ENERGY MATERIALS CO., LTD., Hunan (CN)

(72) Inventors: Xin Guo, Changsha (CN); Haishi Hu, Changsha (CN); Zhibing Hu, Changsha (CN); Chenghuan Huang, Changsha (CN); Haiyan Zhang, Changsha (CN); Youyuan Zhou, Changsha (CN)

(73) Assignees: Minmetals New Energy Materials(Hunan) Co., Ltd., Hunan (CN); JINCHI ENERGY MATERIALS CO., LTD., Hunan (CN)

( * ) Notice: Subject to any disclaimer, the term of this patent is extended or adjusted under 35 U.S.C. 154(b) by 443 days.

(21) Appl. No.: 17/311,465

(22) PCT Filed: May 12, 2020

(86) PCT No.: PCT/CN2020/089850
§ 371 (c)(1),
(2) Date: Jun. 7, 2021

(87) PCT Pub. No.: WO2021/159618
PCT Pub. Date: Aug. 19, 2021

(65) Prior Publication Data
US 2022/0102717 A1 Mar. 31, 2022

(30) Foreign Application Priority Data
Feb. 12, 2020 (CN) .......................... 202010087825.7

(51) Int. Cl.
*H01M 4/525* (2010.01)
*C01G 53/00* (2006.01)
(Continued)

(52) U.S. Cl.
CPC .......... *H01M 4/525* (2013.01); *C01G 53/006* (2013.01); *C01G 53/42* (2013.01); *C01G 53/50* (2013.01);
(Continued)

(58) Field of Classification Search
CPC ................ H01M 4/525; H01M 4/505; H01M 10/0525; H01M 2004/021;
(Continued)

(56) References Cited

U.S. PATENT DOCUMENTS 8,486,564 B2   7/2013  Nagai
9,391,318 B2   7/2016  Nagai et al.
(Continued)

FOREIGN PATENT DOCUMENTS

CN   102612772 A   7/2012
CN   103562136 A   2/2014
(Continued)

OTHER PUBLICATIONS

Han et al. "Hierarchically assembled LiNi0.8Co0.1Mn0.1O2 secondary particles with high exposure of {010} plane synthesized via co-precipitation method." Electrochimica Acta 329 (2020) 135057, available online Oct. 17, 2019 (Year: 2019).*
(Continued)

*Primary Examiner* — Michael L Dignan
(74) *Attorney, Agent, or Firm* — Cooper Legal Group, LLC (57) ABSTRACT

Disclosed is a positive electrode material for a high-power lithium ion battery. The positive electrode material is in form of secondary particles with a hollow microsphere structure,
(Continued)

and a shell of the secondary particles is formed by aggregating a plurality of primary particles. The secondary particles have a uniform particle size, a loose and porous surface, and a large specific surface area. The obtained particles are regular in shape, stable in material structure, so that the positive electrode material has high rate performance and excellent cycle performance. The disclosure also provides a preparation method for the positive electrode material comprising (1) synthesizing a $Ni_xCo_yM_z(OH)_2$ precursor by a co-precipitation method, such that the precursor has a central portion consisted by fine particles and a shell portion consisted by large particles having a larger particle size than that of the fine particles; (2) mixing the precursor and a lithium salt uniformly, and adding an oxide of a doping element during the mixing, and then sintering the mixture to provide a $Li_aNi_xCo_yM_zO_2$ positive electrode material. The preparation method is simple and low cost, and can be industrialized.

10 Claims, 3 Drawing Sheets

(51) Int. Cl.
  *H01M 4/505* (2010.01)
  *H01M 10/0525* (2010.01)
  *H01M 4/02* (2006.01)

(52) U.S. Cl.
  CPC ....... *H01M 4/505* (2013.01); *H01M 10/0525* (2013.01); *C01P 2004/03* (2013.01); *C01P 2004/61* (2013.01); *C01P 2004/62* (2013.01); *C01P 2006/12* (2013.01); *C01P 2006/40* (2013.01); *H01M 2004/021* (2013.01); *H01M 2004/028* (2013.01)

(58) Field of Classification Search
  CPC ........... H01M 2004/028; H01M 4/485; H01M 4/628; C01P 2004/03; C01P 2004/61; C01P 2004/62; C01P 2006/12; C01P 2006/40; C01P 2002/54; C01P 2004/34; C01P 2004/50; C01P 2004/84; Y02E 60/10
  See application file for complete search history.

(56) References Cited

U.S. PATENT DOCUMENTS

| | | | |
|---|---|---|---|
| 9,559,351 | B2 | 1/2017 | Mori |
| 9,653,725 | B2 | 5/2017 | Nagai |
| 10,424,787 | B2 | 9/2019 | Kamata et al. |
| 10,601,036 | B2 | 3/2020 | Aida et al. |
| 2005/0058588 | A1 | 3/2005 | Kang |
| 2011/0052989 | A1* | 3/2011 | Venkatachalam ............ C01G 45/1257 429/223 |
| 2012/0282525 | A1 | 11/2012 | Nagai |
| 2013/0011331 | A1 | 1/2013 | Nagai |
| 2013/0302687 | A1 | 11/2013 | Nagai |
| 2013/0337331 | A1* | 12/2013 | Mori ............... H01M 4/131 117/70 |
| 2014/0205901 | A1* | 7/2014 | Nagai ............... H01M 4/131 427/126.6 |
| 2016/0093885 | A1 | 3/2016 | Kamata et al. |
| 2017/0110726 | A1 | 4/2017 | Aida et al. |
| 2017/0207453 | A1* | 7/2017 | Oda ............. H01M 10/0525 |
| 2018/0254481 | A2 | 9/2018 | Kamata et al. |
| 2019/0341610 | A1 | 11/2019 | Aida et al. |
| 2019/0379038 | A1* | 12/2019 | Toma ............. H01M 4/525 |
| 2020/0006770 | A1 | 1/2020 | Kamata et al. |

FOREIGN PATENT DOCUMENTS

| | | | |
|---|---|---|---|
| CN | 103765638 | A | 4/2014 |
| CN | 105122517 | A | 12/2015 |
| CN | 105185979 | * | 12/2015 ........... H01M 4/505 |
| CN | 105185979 | A | 12/2015 |
| CN | 105958063 | A | 9/2016 |
| CN | 106133960 | A | 11/2016 |
| CN | 110518232 | A | 11/2019 |
| CN | 110931772 | A | 3/2020 |
| EP | 3176859 | A1 | 6/2017 |
| JP | 2011119092 | A | 6/2011 |
| JP | 2013051172 | A | 3/2013 |
| JP | 2015191844 | A | 11/2015 |
| JP | 2015227263 | A | 12/2015 |
| JP | 2016154143 | A | 8/2016 |
| JP | 2018095505 | A | 6/2018 |
| JP | 2019149349 | A | 9/2019 |
| JP | 2020001935 | A | 1/2020 |
| WO | 2012131779 | A1 | 10/2012 |

OTHER PUBLICATIONS

Liang et al. "Co-precipitation synthesis of Ni0.6Co0.2Mn0.2(OH)2 precursor and characterization of LiNi0.6Co0.2Mn0.2O2 cathode material for secondary lithium batteries." Electrochmica Acta 130 (2014) 82-89 (Year: 2014).*
W. Hua et al. "Unravelling the growth mechanism of hierarchically structured Ni1/3Co1/3Mn1/3(OH)2 and their application as precursors for high-power cathode materials." Electrochimica Acta 232 (2017) 123-131 (Year: 2017).*
Su et al. "Exposing the {010} Planes by Oriented Self-Assembly with Nanosheets to Improve the Electrochemical Performances of Ni-Rich Li[Ni0.8Co0.1Mn0.1]O2 Microspheres." ACS Appl. Mater. Interfaces 2018, 10, 6407-6414 (Year: 2018).*
International Search Report in the international application No. PCT/CN2020/089850, mailed on Nov. 13, 2020, 4 pgs.
First Office Action of the Chinese application No. 202010087825.7, issued on Apr. 3, 2020, 19 pgs.
Supplementary European Search Report in the European application No. 20904305.8, mailed on Oct. 7, 2022, 6 pgs.
English translation of the Written Opinion of the International Search Authority in the international application No. PCT/CN2020/089850, mailed on Nov. 13, 2020, 5 pgs.

* cited by examiner

POSITIVE ELECTRODE MATERIAL FOR HIGH-POWER LITHIUM ION BATTERY AND PREPARATION METHOD THEREOF

The present application claims benefit of Chinese Application No. 202010087825.7, filed on Feb. 12, 2020, the contents of which are hereby incorporated by reference in its entirety.

TECHNICAL FIELD

The disclosure relates to the technical field of lithium ion batteries, and in particular, to a positive electrode material for a high-power lithium ion battery and a preparation method thereof.

BACKGROUND

In recent years, new energy vehicles have developed vigorously. To meet the needs for energy conservation and emission reduction and to achieve the smooth transition of conventional vehicles to new energy vehicles, hybrid electric vehicles (HEVs) are now the best choice. Lithium ion batteries have been recognized as the first choice of automotive power battery in the future for their advantages of light and convenience, high specific energy, high specific power, high efficiency and environmental protection. A hybrid electric vehicle has an internal combustion engine and a power battery together as a driving system, which requires a high-power performance of the power battery. The development of lithium ion batteries with high output power is therefore highly expected.

In order to obtain a battery having good performances such as high cycle properties, low resistance, high output power and the like, it is necessary to form positive electrode material particles with uniform and moderate particle size and large specific surface area for a lithium composite oxide as a positive electrode active material. A positive electrode material with a hollow structure has a loose and porous surface and a large specific surface area, which increases the contact between the positive electrode material and an electrolyte, thus provides strong support for high current discharge of the battery, thereby improving the power performance of the battery. Currently, there are mainly two kinds of methods for preparing hollow positive electrode materials, the first is a template method and the second is an inner core oxidation method.

With respect to the first method, a templating agent (e.g., carbon microspheres) as a substrate for crystal growth may be added into a base solution for synthesizing a precursor, and then removed with a certain manner in a subsequent process, thereby obtaining a hollow material. However, the introduction and removal of the templating agent will increase the cost for raw materials and the difficulty for the processes controlling, particularly the cost for synthesis of the precursor and the difficulty for controlling the processes thereof.

With respect to the second method, the inner core oxidation method, an oxidizing atmosphere (such as an air atmosphere) is used in a nucleation and inner core growth stage, and an inert gas atmosphere (such as nitrogen) is used in a shell growth stage. The primary particles of the precursor inner core prepared by this method are very fine, and the inner core is loose, and a hollow positive electrode material can be obtained after sintering. The principle of the method is that $Mn^{2+}$ is oxidized to $Mn^{3+}$ by means of an oxidizing atmosphere at the nucleation and inner core growth stages, which reduces the crystallinity of the precursor and thus makes the core primary particles being loosen arranged and fine in size. However, this method is only suitable for positive electrode materials with a certain amount of Mn (e.g., $z \geq 0.1$ in $Li_aNi_xCo_yMn_zO_2$), and is not suitable for positive electrode materials without Mn or with a very low Mn content (e.g., nickel-cobalt-aluminum ternary materials). At the same time, due to oxidation in the synthesis process, the obtained precursor has a poor crystallinity and a low tapping density, meanwhile has increased contents of Na and S as impurities in the precursor.

In addition, in the synthesis process of the hollow positive electrode material, the precursor may easily collapse during sintering because of the difference between its internal and external structures. Moreover, due to the hollow structure, tapping density and compaction density of such material are relatively low and the particle strength is not high, thus the positive electrode material is easily broken when the electrode sheet is rolled, which will damage the original structure of the material and affect its electrical performance. At the same time, the relatively high specific surface area of such material may facilitate the increase of output power but may deteriorate cycling performance of a battery, since the increased contact area between the material and electrolyte may lead to increased side reactions.

SUMMARY

The technical problems to be solved by the disclosure are to overcome the disadvantages and deficiencies mentioned in the above background, and provide a positive electrode material with hollow microsphere structure which has excellent rate performance and cycle performance for a lithium ion battery, a preparation method thereof, and an electrode and a lithium ion battery prepared with the positive electrode material.

In order to solve the above technical problems, the disclosure provides the following technical solutions.

A positive electrode material for a high-power lithium ion battery, in which the positive electrode material is represented by $Li_aNi_xCo_yM_zO_2$, $0.96 \leq a \leq 1.35$, $0.3 \leq x \leq 1$, $0 \leq y \leq 0.4$, $0 \leq z \leq 0.4$, $x+y+z=1$, and M is one or more selected from Mn, Al, Zr, Mg, W, Ti, Y, La, B and Sr; and the positive electrode material is secondary particles with a hollow microsphere structure, and a shell of the secondary particles is formed by aggregating a plurality of primary particles.

Preferably, the secondary particles of the above said secondary particles for a lithium battery have an average particle size of 0.1 μm~40 μm and a specific surface area of 0.1 m²/g~15.0 m²/g; the primary particles have a particle size of 0.1 μm~3.5 μm; and a ratio of a thickness of the shell of the secondary particles to the particle size of the secondary particles is 1%~49%. The positive electrode material further comprises a doping element, which is one or more selected from Al, Zr, Mg, W, Ti, Y, La, B and Sr, and is present in the positive electrode material in a mass percentage of 0.01 wt %~2 wt %.

The positive electrode material with the micro-scale hollow microsphere structure has a relatively low thermal expansion coefficient, a relatively large specific surface area, a uniform particle size and a narrow particle size distribution. When it is prepared to a positive electrode sheet, the contact area between the material and an electrolyte may be effectively increased, which may facilitate the diffusion of lithium ions in a sintering process; facilitate the transmission of electrons and the insertion/extraction of Li ions; and buffer volume changes when pressing the material and during charging/discharging process, such that he rate performance and cycle performance of the positive electrode material can be improved, thereby improving the output performance and the safety of a power battery, which is of great significance to improve the driving performance and safety performance of electric vehicles.

Based on a general inventive concept, the disclosure also provides a preparation method of the positive electrode material for a lithium ion battery as described above, comprising the steps of:

(1) a $Ni_xCo_yM_z(OH)_2$ precursor is synthesized by a co-precipitation method comprising a nucleation and inner core growth stage and a shell growth stage, in which no complexing agent is used or a low concentration of a complexing agent is used in the nucleation and inner core growth stage; and a higher concentration of the complexing agent than that used in the nucleation and inner core growth stage is used in the shell growth stage; and the obtained precursor has a central portion consisting of fine particles and a shell portion consisting of large particles having a particle size larger than that of the fine particles, and particles of the central portion and the shell portion of the obtained precursor both have a component of $Ni_xCo_yM_z(OH)_2$;

(2) The precursor obtained in step (1) is mixed uniformly with a lithium salt, and then the mixture is sintered to obtain a $Li_aNi_xCo_yM_zO_2$ positive electrode material.

Preferably, in step (1), synthesizing the $Ni_xCo_yM_z(OH)_2$ precursor by a co-precipitation method specifically comprises the steps of adding a metal salt solution of Ni, Co and M, an alkaline solution and an aqueous ammonia solution to a reaction kettle containing a base solution for reaction, during which a reaction temperature is 40° C.~60° C., a stirring speed is 100 r/min~1000 r/min, pH of the reaction system is controlled from 8~13, and nitrogen is continuously introduced into the reaction kettle; controlling an ammonium concentration of the reaction system in a range of 0 g/L~15 g/L at the nucleation and inner core growth stage, and in a range of 5 g/L~40 g/L at the shell growth stage for synthesizing the precursor, providing that the ammonium concentration of the reaction system at the shell growth stage is higher than that at the nucleation and inner core growth stage; and subjecting the precipitate obtained from the reaction to solid-liquid separating, aging, washing and drying to obtain the $Ni_xCo_yM_z(OH)_2$ precursor.

More preferably, the ammonium concentration of the reaction system at the nucleation and inner core growth stage for synthesizing the precursor is controlled in a range of 7 g/L~15 g/L, and the ammonium concentration of the reaction system at the shell growth stage is controlled in a range of 30 g/L~40 g/L.

In conventional preparation processes, no complexing agent is needed, the synthesized product is of extremely low tapping density and extremely large specific surface area without addition of any complexing agent, which not only greatly reduces the energy density of the material, but also puts forward extremely high requirements for the post-treatment of a precursor. The product with low tapping density and large specific surface area is easily agglomerated after drying, and the currently used aging and drying processes cannot meet the requirements, thus it is difficult to be produced on a large scale. Without addition of a complexing agent, the precursor is of poor crystallinity and the product is of high contents of impurities, such as Na, S and the like, which not only has a great negative effect on the sintering process and the electrical properties of the positive electrode material, but also results in the phase separation of $Ni(OH)_2$, $Co(OH)_2$ and $Mn(OH)_2$, so that the internal elements of the precursor product are unevenly distributed, thereby reducing the electrical properties of the final product. Whereas in the process of co-precipitation of the three elements of Ni, Co and Mn according to the disclosure, a complexing agent is added to combine with $Ni^{2+}$, $Co^{2+}$ and $Mn^{2+}$ to form free complexed metal ions, which can reduce the precipitation rate appropriately, so that the three elements can be uniformly co-precipitated and the phase separation can be prevented. Moreover, a large number of studies show that the presence of the complexing agent can effectively improve the crystallinity of the product, which is essential to the formation of a dense spherical hydroxide.

When nucleus are forming and inner cores are growing, the core primary particles produced are fine and loose without a complexing agent or with a low concentration of a complexing agent (the concentration of ammonium is 0 g/L~15 g/L, more preferably 7 g/L~15 g/L). When the shell is growing, a higher concentration of the complexing agent is used (the concentration of ammonium is 5 g/L~40 g/L, more preferably 30 g/L~40 g/L), the primary particles produced, as compared with the core particles, are slightly larger, resulting in the formation of dense shell portion. In the sintering process of the positive electrode material, since the core primary particles are fine and loose and has a high reactivity, the core particles will shrink outward the shell as the sintering is proceeding, thereby forming the positive electrode material with a hollow structure.

The endpoint of the nucleation and inner core growth stage depends on the control of the particle size. When the inner core particle size meets a predetermined requirement, the concentration of ammonium can be increased, so that the shell growth stage starts, which may last until the particles grow to the target particle size.

According to the disclosure, the difference between the core and the shell of the precursor is realized by controlling the concentration of ammonium at different reaction stages of the precursor synthesis, so that a new raw material such as a templating agent needn't to be introduced. The preparation method has a wide application, not only for Mn containing positive electrode materials, but also for positive electrode materials without Mn, such as Ni, Co and Al containing positive electrode materials or the like. Meanwhile, compared with the precursor produced by the inner core oxidation method, the crystallinity and tapping density of the precursor are obviously improved, and the contents of Na and S as impurities are relatively low due to the nitrogen protection during the whole synthesis process. In addition, since aqueous ammonia solution is not used or only a small amount of the aqueous ammonia solution is used in the nucleation and inner core growth stage, the cost of precursor synthesis can be reduced, and the volatilization amount of aqueous ammonia in the reaction system can be reduced, thereby reducing environmental pollution. Additionally, the reaction temperature of the nucleation and inner core growth stage and the shell growth stage is at 40° C.~60° C. At a temperature higher than 60° C., $Mn^{2+}$ in the alkaline environment is more easily oxidized, which may lead to higher requirements for sealing performance of the equipment and a higher flow rate of inert gas, thereby increasing the cost of the equipment and the consumption of the inert gas, requiring a high energy consumption, therefore the cost for producing the precursor will be increased.

More preferably, the metal salt solution is one or more selected from a sulfate solution, a nitrate solution, a chloride solution, an acetate solution and a meta-aluminate solution, and the total metal ion concentration in the metal salt solution is 0.05 mol/L~3 mol/L; the alkaline solution is a sodium hydroxide solution and has a concentration of 1 mol/L~10 mol/L; and the ammonium concentration of the aqueous ammonia solution is 3 mol/L~6 mol/L; and the particle size of the fine particles of the central portion is <0.3 µm and the particle size of the large particles of the shell portion is ≥0.3 µm.

Preferably, in step (2), an addition amount of the lithium salt is based on a molar ratio of Li to Ni+Co+M of 0.96~1.35, and the lithium salt is one or more selected from lithium carbonate, lithium hydroxide, lithium oxalate and lithium acetate; when the precursor is mixed with the lithium salt, an oxide of a doping element which is one or more selected from Al, Zr, Mg, W, Ti, Y, La, B and Sr is additionally added, and the doping element is presented in the positive electrode material in a mass percentage of 0.01 wt %~2 wt %.

Preferably, in step (2), the sintering is performed under a temperature of 500° C.~1000° C. for 6~24 hours with an atmosphere of air or oxygen or a mixture of oxygen and air.

More preferably, a multi-stage temperature-controlled sintering method is used in the sintering process, in which firstly a temperature of 500° C.~700° C. is held for 5~6 hours, secondly the temperature is elevated to 810° C.~1000° C. and held for 8~10 hours, and lastly the temperature is lowered to 700° C.~750° C. and held for 5~8 hours.

According to the conventional preparation method, in the synthesis process of a hollow positive electrode material, a precursor may easily collapse during sintering because of the difference between its internal and external structures. In order to overcome this problem, the disclosure improves and adjusts the sintering process by the multi-stage temperature-controlled sintering process, and providing a temperature-holding process at the cooling stage, which facilitates the stabilization of the hollow structure, and causes the inner particles of the material shrinking outward, and oxygen diffusing from the outside to the inside so as to form a uniform and stable hollow positive electrode material. In addition, a high amount of lithium salt facilitates the formation of the hollow structure during the sintering process, because the higher amount of lithium increases the reactivity between the precursor and the lithium ion, and promotes the particles of the central portion diffusing outside to react with the lithium ion, thereby easily forming the hollow morphology.

The relatively high specific surface area of the positive electrode material may increase the contact area between the positive electrode material and the electrolyte, which is benefit to the increase of output power and the decrease of diffusion distance of the lithium ions, but may also increase side reactions therebetween which leads to a risk of deterioration of a cycle performance. A common means for improving the cycle performance is surface coating. However, the surface coating tends to reduce the specific surface area of a material, which conflicts with the design idea of the material of the disclosure. In order to further improve particle strength and cycle performance of the positive electrode material, corresponding element(s) is(are) doped in the sintering process in the disclosure to improve the particle strength, which not only prevents the particles from being broken when an electrode sheet is rolled, thus improves the processing performance of the material, but also prevents the material from being structurally unstable which otherwise occurs due to the side reactions with the electrolyte caused by the large specific surface, thus improves the cycle stability of the material.

In general, the technical principle for preparing the hollow microsphere structure is as follows. 1) The difference between the central portion and the shell portion of the precursor is achieved by controlling the concentration of ammonium in the precursor synthesis process, so that the particles of the central portion of the precursor have a small particle size and are loose, while the particles of the shell portion of the precursor have a slightly larger particle size and are dense. 2) By utilizing the difference between the particles of the central portion and that of the shell portion of the precursor, the particles shrink from the inside toward the outside, and oxygen diffuses from the outside toward the inside during the sintering by controlling the sintering processes (i.e., temperature control and duration control) to form the spherical particle material with the inner hollow morphology. 3) Doping elements during the sintering process improves particle strength and cycle performance.

Based on one single general inventive concept, the disclosure also provides an electrode and a lithium ion battery (the lithium ion battery comprises a positive electrode, a negative electrode, a separator and an electrolyte). An active substance of the electrode and the lithium ion battery comprises the above positive electrode material. In the electrode, content by mass of the positive electrode material is 50~99.9%.

Compared with the prior art, the disclosure has the following advantages.

1. The positive electrode material for a lithium ion battery of the disclosure has a hollow microsphere structure, a uniform particle size, a loose and porous surface and a high specific surface area, which can increase the reaction area between the positive electrode material and the electrolyte, and shorten the diffusion distance of lithium ion, so that the lithium ion battery has high rate performance and excellent cycle performance.

2. The preparation method of the positive electrode material of the disclosure is simple, has a low cost, and is capable of being industrially produced. In addition, the obtained material is good in consistency, regular in particle shape, narrow in particle size distribution and stable in material structure.

3. The electrode and the lithium ion battery of the disclosure have good performances by using the above-mentioned positive electrode material, such as high cycle performance, low resistance, high output power and the like, thereby having a high safety, which is significant for improving the driving performance and safety of an electric vehicle.

BRIEF DESCRIPTION OF THE DRAWINGS

Reference will now be made briefly to the accompanying drawings required in the examples or the description of the prior art to describe the examples of the disclosure or the technical solutions in the prior art more clearly. It will be apparent that the accompanying drawings in the following description illustrate some examples of the disclosure, and other drawings may be obtained according to these drawings to those skilled in the art without involving any inventive effort.

DETAILED DESCRIPTION

In order to facilitate understanding of the disclosure, the disclosure will now be described more comprehensively and in detail with reference to the accompanying drawings and the preferred examples thereof, however the scope of the disclosure is not limited to the following specific examples.

Unless defined otherwise, all technical terms used hereinafter have the same meanings as commonly understood by those skilled in the art. The technical terms used herein are for the purpose of describing specific examples only and are not intended to limit the scope of the disclosure.

Unless specifically stated otherwise, the various raw materials, reagents, instruments and equipment used in the disclosure are commercially available or can be prepared by existing methods.

Example 1

Figure 1:
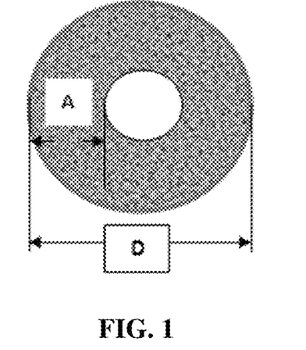
FIG. 1 is a schematic cross-sectional view of a positive electrode material according to the disclosure (A is the thickness of the shell portion and D is the secondary particle size)

A positive electrode material for a lithium ion battery according to the disclosure having the chemical formula of $Li_{1.2}Ni_{0.6}Co_{0.2}Mn_{0.2}O_2$, as shown in FIG. 1, is in form of secondary particles with a hollow microsphere structure and a shell formed by aggregated primary particles.

The positive electrode material was prepared with the following steps.

(1) $Ni_{0.6}Co_{0.2}Mn_{0.2}(OH)_2$ precursor was synthesized by a co-precipitation method including a nucleation and inner core growth stage and a shell growth stage. Specifically the method included the following steps. First, a mixed metal salt solution having a total metal ion concentration of 2 mol/L was prepared by using sulfates of Ni, Co and Mn with the molar ratio of Ni:Co:Mn=6:2:2. Then, 2 mol/L of sodium hydroxide solution and an aqueous ammonia solution with an ammonium concentration of 6 mol/L were prepared. Pure water was used as the base solution of the reaction kettle, and pH of the base solution in the reaction kettle was adjusted to 12.0 with sodium hydroxide. By controlling the ammonium concentration at 7 g/L, the mixed metal salt solution, the sodium hydroxide solution and the aqueous ammonia solution were added into the reaction kettle via metering pumps for reaction. The reaction temperature was 55° C., the stirring speed was 500 r/min, pH of the reaction system in the reaction kettle was controlled at 10.5~12.0, and nitrogen was continuously introduced into the reaction kettle during the reaction. The ammonium concentration of the reaction system was controlled at 7 g/L at the nucleation and inner core growth stage until the particle size of the material increased to 1.5 μm, and then the ammonium concentration of the reaction system was adjusted to 35 g/L to allow the shell growing until the particle size increased to 5.5 μm. The precipitate from the reaction was obtained by solid-liquid separating, and the precipitate was subjected to aging, washing and drying to provide $Ni_{0.6}Co_{0.2}Mn_{0.2}(OH)_2$ precursor with the average particle size of 5.5 μm and the thickness of shell portion of about 2 μm. The precursor was constituted by a central portion consisted of fine particles and a shell portion consisted of large particles with a particle size larger than that of the fine particles.

(2) An appropriate amount of the above said precursor and lithium carbonate were weighed with a lithium to metal ratio (i.e., a molar ratio of Li to Ni+Co+Mn) of 1.20, an appropriate amount of MgO was weighed based on 0.1 wt % of Mg in the positive electrode material, and an appropriate amount of $TiO_2$ was weighed based on 0.08 wt % of Ti in the positive electrode material. The above feeds were uniformly mixed and then sintered at a high temperature under a sintering atmosphere of a mixture of oxygen and air, in which the material was sintered at 700° C. for 6 hours firstly and then at an elevated temperature of 850° C. for 10 hours. After the sintering and cooling to room temperature, the material was sieved to obtain the positive electrode material, $Li_{1.2}Ni_{0.6}Co_{0.2}Mn_{0.2}O_2$, with a hollow structure and doped with Mg and Ti.

The physical and chemical properties of the positive electrode material $Li_{1.2}Ni_{0.6}Co_{0.2}Mn_{0.2}O_2$ were measured. The positive electrode material had the specific surface area of 1.08 m²/g and the average particle size of 5.5 μm. The material was subjected to SEM and cross-sectional SEM observations. The SEM result showed that the material had a secondary spherical structure and the particle size was uniform. The cross-sectional SEM result showed that the positive electrode material was in a form of hollow microsphere secondary particles which had a shell formed by primary particles aggregated by sintering and having a thickness of about 2.0 μm.

The electrical performance of the positive electrode material was evaluated by using a 2032-type button cell. The positive electrode material had an initial discharge specific capacity of 165 mAh/g at 1 C and had a relatively good rate performance which was 97.81% at 2 C/1 C, 93.44% at 5 C/1 C and 90.65% at 10 C/1 C.

Example 2

A positive electrode material for a lithium ion battery according to the disclosure having the chemical formula of $Li_{1.08}Ni_{0.9}Co_{0.08}Al_{0.02}O_2$, as shown in FIG. 1, is in form of secondary particles with a hollow microsphere structure and a shell formed by aggregated primary particles.

The positive electrode material was prepared with the following steps.

(1) $Ni_{0.9}Co_{0.08}Al_{0.02}(OH)_2$ precursor was synthesized by a co-precipitation method including a nucleation and inner core growth stage and a shell growth stage. Specifically the method included the following steps. First, a mixed metal salt solution having a total metal ion concentration of 2 mol/L was prepared by using sulfates of Ni and Co with the molar ratio of Ni:Co=90:8. Then, a meta-aluminate solution containing 0.1 mol/L of aluminum was prepared by using an aluminum sulfate and an excess of sodium hydroxide. Next, 2 mol/L of sodium hydroxide solution and an aqueous ammonia solution with an ammonium concentration of 5 mol/L were prepared. Pure water was used as the base solution of the reaction kettle, and pH of the base solution in the reaction kettle was adjusted to 11.5 with sodium hydroxide. By adjusting the ammonium concentration to 10 g/L, the mixed metal salt solution, the meta-aluminate solution, the sodium hydroxide solution and the aqueous ammonia solution were added into the reaction kettle via metering pumps for reaction. The reaction temperature was 55° C., the stirring speed was 450 r/min, pH of the reaction system in the reaction kettle was controlled at 10.0~11.5, and nitrogen was continuously introduced into the reaction kettle during the reaction. The flowing ratio of the mixed metal salt solution to the meta-aluminate solution was controlled so that the metal molar ratio of Ni:Co:Al was 90:8:2. The ammonium concentration of the reaction system was controlled at 10 g/L at the nucleation and inner core growth stage until the particle size of the material increased to 2 μm, and then the ammonium concentration of the reaction system was adjusted to 30 g/L to allow the shell growing until the particle size increased to 9.0 μm. The precipitate from the reaction was obtained by solid-liquid separating, and the precipitate was subjected to aging, washing and drying to provide $Ni_{0.9}Co_{0.08}Al_{0.02}(OH)_2$ precursor with the average particle size of 9.0 μm and thickness of shell portion of about 3.5 μm. The precursor was constituted by a central portion consisted of fine particles and a shell portion consisted of large particles with a particle size larger than that of the fine particles.

(2) An appropriate amount of the above said precursor and lithium hydroxide were weighed with a lithium to metal ratio (i.e., a molar ratio of Li to Ni+Co+Mn) of 1.08, and an appropriate amount of $SrCO_3$ was weighed based on 0.2 wt % of Sr in the positive electrode material. The above feeds were uniformly mixed and then sintered at a high temperature under a sintering atmosphere of a mixture of oxygen and air, in which the temperature was elevated to 710° C. directly and held for 12 hours. After the sintering and cooling to room temperature, the material was sieved to obtain the positive electrode material, $Li_{0.08}Ni_{0.9}Co_{0.08}Al_{0.02}O_2$, with a hollow structure and doped with Sr.

Figure 2:
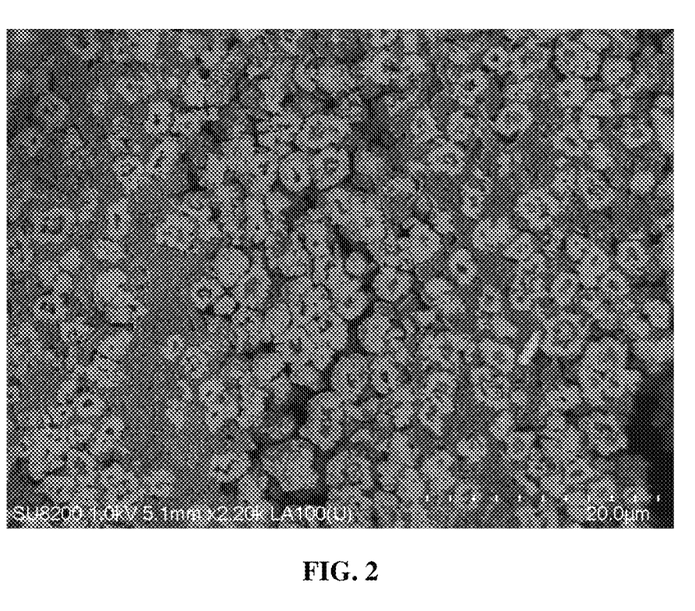
FIG. 2 is an electron microscopy picture of a sectional view of the positive electrode material obtained in Example 2.

The physical and chemical properties of the positive electrode material $Li_{1.08}Ni_{0.9}Co_{0.08}Al_{0.02}O_2$ were measured. The positive electrode material had the specific surface area of 0.76 m²/g and the average particle size of 9.0 μm. The material was subjected to SEM and cross-sectional SEM observations. The SEM result showed that the material had a secondary spherical structure and the particle size was uniform. The cross-sectional SEM result (see FIG. 2) showed that the positive electrode material was in a form of hollow microsphere secondary particles which had a shell formed by primary particles aggregated by sintering and having a thickness of about 3.5 μm.

The electrical performance of the positive electrode material was evaluated by using a 2032-type button cell. The positive electrode material had an initial discharge specific capacity of 192 mAh/g at 1 C and had a relatively good rate performance which was 97.09% at 2 C/1 C, 92.68% at 5 C/1 C and 90.00% at 10 C/1 C.

Comparative Example 3

A positive electrode material for a lithium ion battery according to the disclosure having the chemical formula of $Ni_{1/3}Co_{1/3}Mn_{1/3}O_2$, as shown in FIG. 1, is in form of secondary particles with a hollow microsphere structure and a shell formed by aggregated primary particles.

The positive electrode material was prepared with the following steps.

(1) $Ni_{1/3}Co_{1/3}Mn_{1/3}(OH)_2$ precursor was synthesized by a co-precipitation method including a nucleation and inner core growth stage and a shell growth stage. Specifically the method included the following steps. First, a mixed metal salt solution having a total metal ion concentration of 2 mol/L was prepared by using sulfates of Ni, Co and Mn with the molar ratio of Ni:Co:Mn=1:1:1. Then, 2 mol/L of sodium hydroxide solution and an aqueous ammonia solution with an ammonium concentration of 5 mol/L were prepared. Pure water was used as the base solution of the reaction kettle, and pH of the base solution in the reaction kettle was adjusted to 11.0 with sodium hydroxide. The aqueous ammonium solution was not added (ensuring the ammonium concentration was 0). The mixed metal salt solution and the sodium hydroxide solution were added into the reaction kettle via metering pumps for reaction. The reaction temperature was 50° C., the stirring speed was 500 r/min, pH of the reaction system in the reaction kettle was controlled at 9.5~11.0, and nitrogen was continuously introduced into the reaction kettle during the reaction. The aqueous ammonium solution was not added at the nucleation and inner core growth stage until the particle size of the material increased to 1.6 μm, and then the aqueous ammonium solution was added and the ammonium concentration of the reaction system was controlled at 10 g/L to allow the shell growing until the particle size increased to 4.0 μm. The precipitate from the reaction was obtained by solid-liquid separating, and the precipitate was subjected to aging, washing and drying to provide $Ni_{1/3}Co_{1/3}Mn_{1/3}(OH)_2$ precursor with the average particle size of 4 μm and thickness of shell portion of about 1.2 μm. The precursor was constituted by a central portion consisted of fine particles and a shell portion consisted of large particles with a particle size larger than that of the fine particles.

(2) An appropriate amount of the above said precursor and lithium carbonate were weighed with a lithium to metal ratio (i.e., a molar ratio of Li to Ni+Co+Mn) of 1.25, and an appropriate amount of $ZrO_2$ was weighed based on 0.5 wt % of Zr in the positive electrode material. The above feeds were uniformly mixed and then sintered at a high temperature under a sintering atmosphere of a mixture of oxygen and air, in which the sintering process included a heating platform, a high-temperature platform and a cooling platform, i.e., sintering at 600° C. for 6 hours firstly, then increasing the temperature to 900° C. and holding for 8 hours, last cooling the temperature to 700° C. and holding for 5 hours. After the sintering and cooling to room temperature, the material was sieved to obtain the positive electrode material, $Li_{1.25}Ni_{1/3}Co_{1/3}Mn_{1/3}O_2$, with a hollow structure and doped with Mg and Zr.

The physical and chemical properties of the positive electrode material $Li_{1.25}Ni_{1/3}Co_{1/3}Mn_{1/3}O_2$ were measured. The positive electrode material had the specific surface area of 2.13 m²/g, the average particle size of secondary particles of 4.5 μm and the average particle size of primary particles of 0.1 μm to 2 μm. The material was subjected to SEM and cross-sectional SEM observations (see FIG. 3 and FIG. 4).

Figure 3:
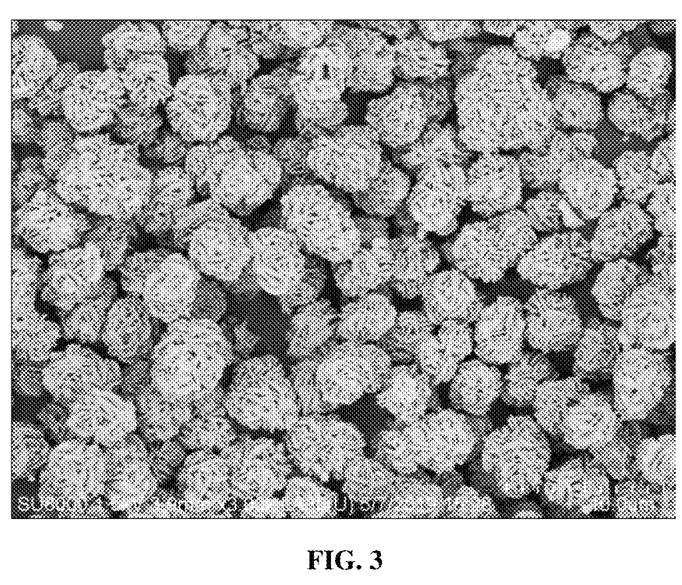
FIG. 3 is an electron microscopy picture of the positive electrode material obtained in Comparative Example 3.
Figure 4:
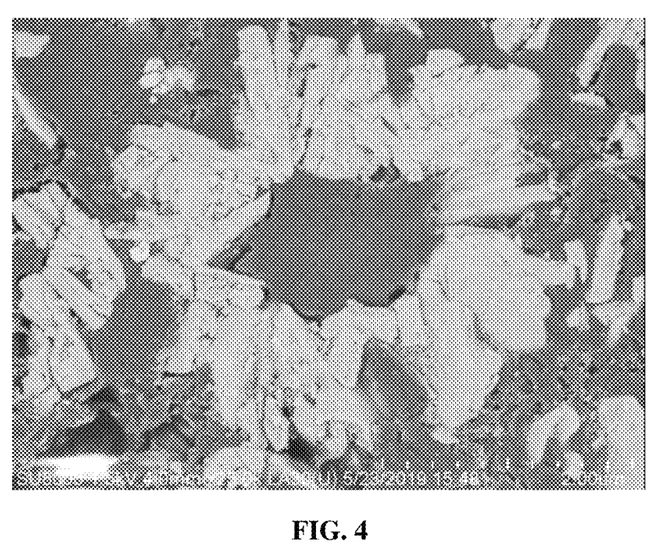
FIG. 4 is an electron microscopy picture of a sectional view of the positive electrode material obtained in Comparative Example 3.

FIG. 3 shows that the material has a secondary spherical structure and the particle size is uniform. FIG. 4 shows that the positive electrode material is in a form of hollow microsphere secondary particles which had a shell formed by primary particles aggregated by sintering and having a thickness of about 1.2 μm.

Figure 5:
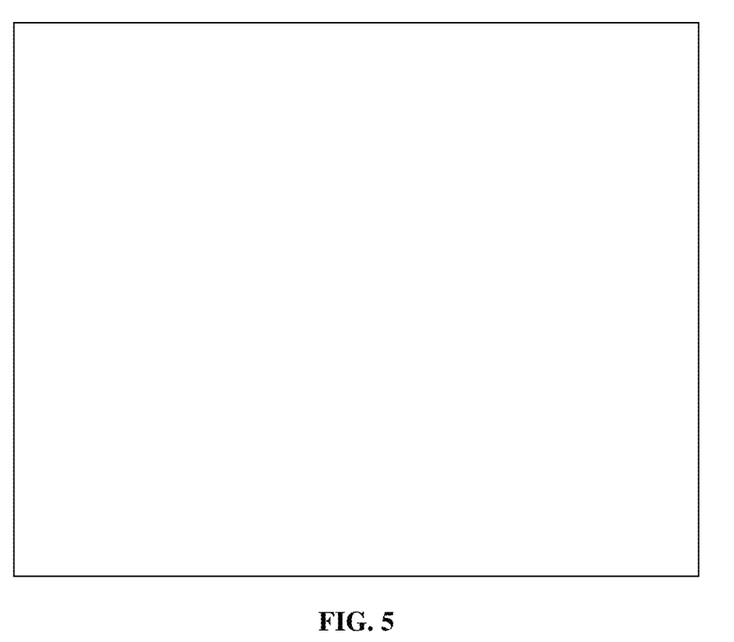
FIG. 5 is a graph showing the discharge specific capacity of the positive electrode material obtained in Comparative Example 3 at different rates.

The electrical performance of the positive electrode material was evaluated by using a 2032-type button cell. The result is shown in FIG. 5. The positive electrode material had an initial discharge specific capacity of 147.7 mAh/g at 1 C and had a relatively good rate performance which was 98.24% at 2 C/1 C, 94.85% at 5 C/1 C and 90.66% at 10 C/1 C.

Comparative Example 4

A positive electrode material for a lithium ion battery according to the disclosure having the chemical formula of $Li_{1.1}Ni_{0.4}Co_{0.3}Mn_{0.3}O_2$, as shown in FIG. 1, is in form of secondary particles with a hollow microsphere structure and a shell formed by aggregated primary particles.

The positive electrode material was prepared with the following steps.

(1) $Ni_{0.4}Co_{0.3}Mn_{0.3}(OH)_2$ precursor was synthesized by a co-precipitation method including a nucleation and inner core growth stage and a shell growth stage. Specifically the method included the following steps. First, a mixed metal salt solution having a total metal ion concentration of 2 mol/L was prepared by using sulfates of Ni, Co and Mn with the molar ratio of Ni:Co:Mn=4:3:3. Then, 4 mol/L of sodium hydroxide solution and an aqueous ammonia solution with an ammonium concentration of 5 mol/L were prepared. Pure water was used as the base solution of the reaction kettle, and pH of the base solution in the reaction kettle was adjusted to 13.0 with sodium hydroxide. The aqueous ammonium solution was not added (ensuring the ammonium concentration was 0). The mixed metal salt solution and the sodium hydroxide solution were added into the reaction kettle via metering pumps for reaction. The reaction temperature was 45° C., the stirring speed was 600 r/min, pH of the reaction system in the reaction kettle was controlled at 9.5~13.0, and nitrogen was continuously introduced into the reaction kettle during reaction. The aqueous ammonium solution was not added at the nucleation and inner core growth stage until the particle size of the material increased to 0.8 μm, and then the ammonium concentration of the reaction system was adjusted to 15 g/L to allow the shell growing until the particle size increased to 3.8 μm. The precipitate from the reaction was obtained by solid-liquid separating, and the precipitate was subjected to aging, washing and drying to provide $Ni_{0.4}Co_{0.3}Mn_{0.3}(OH)_2$ precursor with the average particle size of 3.8 μm and thickness of shell portion of about 1.5 μm. The precursor was constituted by a central portion consisted of fine particles and a shell portion consisted of large particles with a particle size larger than that of the fine particles.

(2) An appropriate amount of the above said precursor and lithium carbonate were weighed with a lithium to metal ratio (i.e., a molar ratio of Li to Ni+Co+Mn) of 1.10, and an appropriate amount of $ZrO_2$ was weighed based on 0.3 wt % of Zr in the positive electrode material, and an appropriate amount of boric acid was weighed based on 0.1 wt % of B in the positive electrode material. The above feeds were uniformly mixed and then sintered at a high temperature under a sintering atmosphere of a mixture of oxygen and air, in which the sintering process included a heating platform, a high-temperature platform and a cooling platform, i.e., sintering at 660° C. for 5 hours firstly, then increasing the temperature to 810° C. and holding for 8 hours, last cooling the temperature to 700° C. and holding for 8 hours. After the sintering and cooling to room temperature, the material was sieved to obtain the positive electrode material, $Li_{1.1}Ni_{0.4}Co_{0.3}Mn_{0.3}O_2$, with a hollow structure and doped with Zr and B.

The physical and chemical properties of the positive electrode material $Li_{1.1}Ni_{0.4}Co_{0.3}Mn_{0.3}O_2$ were measured. The positive electrode material had the specific surface area of 0.65 m$^2$/g, the average particle size of 4.0 μm. The material was subjected to SEM and cross-sectional SEM observations. The SEM result showed that the material had a secondary spherical structure and the particle size was uniform. The cross-sectional SEM result showed that the positive electrode material was in a form of hollow microsphere secondary particles which had a shell formed by primary particles aggregated by sintering and having a thickness of about 1.5 μm.

The electrical performance of the positive electrode material was evaluated by using a 2032-type button cell. The positive electrode material had an initial discharge specific capacity of 152 mAh/g at 1 C and had a relatively good rate performance which was 98.00% at 2 C/1 C, 94.24% at 5 C/1 C and 91.37% at 10 C/1 C.

Comparative Example 5

A positive electrode material for a lithium ion battery according to the disclosure having the chemical formula of $Li_{1.2}Ni_{0.6}Co_{0.2}Mn_{0.2}O_2$, as shown in FIG. 1, is in form of secondary particles with a hollow microsphere structure and a shell formed by aggregated primary particles.

The positive electrode material was prepared with the following steps.

(1) $Ni_{0.6}Co_{0.2}Mn_{0.2}(OH)_2$ precursor was synthesized by a co-precipitation method including a nucleation and inner core growth stage and a shell growth stage. Specifically the method included the following steps. First, a mixed metal salt solution having a total metal ion concentration of 2 mol/L was prepared by using sulfates of Ni, Co and Mn with the molar ratio of Ni:Co:Mn=6:2:2. Then, 2 mol/L of sodium hydroxide solution and an aqueous ammonia solution with an ammonium concentration of 6 mol/L were prepared. Pure water was used as the base solution of the reaction kettle, and pH of the base solution in the reaction kettle was adjusted to 12.0 with sodium hydroxide. By adjusting the ammonium concentration to 0 g/L, the mixed metal salt solution, the sodium hydroxide solution and the aqueous ammonia solution were added into the reaction kettle via metering pumps for reaction. The reaction temperature was 55° C., the stirring speed was 500 r/min, pH of the reaction system in the reaction kettle was controlled at 10.5~12.0, and nitrogen was continuously introduced into the reaction kettle during the reaction. Waiting until the particle size of the material increased to 1.5 μm, then the ammonium concentration of the reaction system was adjusted to 25 g/L to allow the shell growing until the particle size increased to 5.5 μm. The precipitate from the reaction was obtained by solid-liquid separating, and the precipitate was subjected to aging, washing and drying to provide $Ni_{0.6}Co_{0.2}Mn_{0.2}(OH)_2$ precursor with the average particle size of 5.5 μm and thickness of shell portion of about 2 μm. The precursor was constituted by a central portion consisted of fine particles and a shell portion consisted of large particles with a particle size larger than that of the fine particles.

(2) An appropriate amount of the above said precursor and lithium carbonate were weighed with a lithium to metal ratio (i.e., a molar ratio of Li to Ni+Co+Mn) of 1.20, an appropriate amount of MgO was weighed based on 0.1 wt % of Mg in the positive electrode material, and an appropriate amount of $TiO_2$ was weighed based on 0.08 wt % of Ti in the positive electrode material. The above feeds were uniformly mixed and then sintered at a high temperature under a sintering atmosphere of a mixture of oxygen and air, in which the materials were sintered at 700° C. for 6 hours firstly and then at an elevated temperature of 850° C. for 10 hours. After the sintering and cooling to room temperature, the material was sieved to obtain the positive electrode material, $Li_{1.2}Ni_{0.6}Co_{0.2}Mn_{0.2}O_2$, with a hollow structure and doped with Mg and Ti.

The physical and chemical properties of the positive electrode material $Li_{1.2}Ni_{0.6}Co_{0.2}Mn_{0.2}O_2$ were measured. The positive electrode material had the specific surface area of 0.88 m$^2$/g and the average particle size of 6.0 μm. The material was subjected to SEM and cross-sectional SEM observations. The SEM result showed that the material had a secondary spherical structure and the particle size was uniform. The cross-sectional SEM result showed that the positive electrode material was in a form of hollow microsphere secondary particles which had a shell formed by primary particles aggregated by sintering and having a thickness of about 2.5 μm.

The electrical performance of the positive electrode material was evaluated by using a 2032-type button cell. The positive electrode material had an initial discharge specific capacity of 163 mAh/g at 1 C and had a relatively good rate performance which was 92.16% at 2 C/1 C, 88.06% at 5 C/1 C and 86.42% at 10 C/1 C.

Comparative Example 6

A positive electrode material for a lithium ion battery according to the disclosure having the chemical formula of $Li_{1.08}Ni_{0.9}Co_{0.08}Al_{0.02}O_2$, as shown in FIG. 1, is in form of secondary particles with a hollow microsphere structure and a shell formed by aggregated primary particles.

The positive electrode material was prepared with the following steps.

(1) $Ni_{0.9}Co_{0.08}Al_{0.02}(OH)_2$ precursor was synthesized by a co-precipitation method including a nucleation and inner core growth stage and a shell growth stage. Specifically the method included the following steps. First, a mixed metal salt solution having a total metal ion concentration of 2 mol/L was prepared by using sulfates of Ni and Co with the molar ratio of Ni:Co=90:8. Then, 0.1 mol/L of a meta-aluminate solution was prepared by using an aluminum sulfate and an excess of sodium hydroxide. Next, 2 mol/L of sodium hydroxide solution and an aqueous ammonia solution with an ammonium concentration of 5 mol/L were prepared. Pure water was used as the base solution of the reaction kettle, and pH of the base solution in the reaction kettle was adjusted to 11.5 with sodium hydroxide. By adjusting the ammonium concentration to 0 g/L, the mixed metal salt solution, the meta-aluminate solution, the sodium hydroxide solution and the aqueous ammonia solution were added into the reaction kettle via metering pumps for reaction. The reaction temperature was 55° C., the stirring speed was 450 r/min, pH of the reaction system in the reaction kettle was controlled at 10.0~11.5, and nitrogen was continuously introduced into the reaction kettle during the reaction. The flowing ratio of the mixed metal salt solution to the meta-aluminate solution was controlled so that the metal molar ratio of Ni:Co:Al was 90:8:2. Waiting until the particle size of the material increased to 2 μm, then the ammonium concentration of the reaction system was adjusted to 25 g/L to allow the shell growing until the particle size increased to 9.0 μm. The precipitate from the reaction was obtained by solid-liquid separating, and the precipitate was subjected to aging, washing and drying to provide $Ni_{0.9}Co_{0.08}Al_{0.02}(OH)_2$ precursor with the average particle size of 9.0 μm and thickness of shell portion of about 3.5 μm. The precursor was constituted by a central portion consisted of fine particles and a shell portion consisted of large particles with a particle size larger than that of the fine particles.

(2) An appropriate amount of the above said precursor and lithium hydroxide were weighed with a lithium to metal ratio (i.e., a molar ratio of Li to Ni+Co+Mn) of 1.08, and an appropriate amount of $SrCO_3$ was weighed based on 0.2 wt % of Sr in the positive electrode material. The above feeds were uniformly mixed and then sintered at a high temperature under a sintering atmosphere of a mixture of oxygen and air, in which the temperature was elevated to 710° C. directly and held for 12 hours. After the sintering and cooling to room temperature, the material was sieved to obtain the positive electrode material, $Li_{1.08}Ni_{0.9}Co_{0.08}Al_{0.02}O_2$, with a hollow structure and doped with Sr.

The physical and chemical properties of the positive electrode material $Li_{1.08}Ni_{0.9}Co_{0.08}Al_{0.02}O_2$ were measured. The positive electrode material had the specific surface area of 0.5 m²/g and the average particle size of 9.0 μm. The material was subjected to SEM and cross-sectional SEM observations. The SEM result showed that the material had a secondary spherical structure and the particle size was uniform. The cross-sectional SEM result showed that the positive electrode material was in a form of hollow microsphere secondary particles which had a shell formed by primary particles aggregated by sintering and having a thickness of about 4 μm.

The electrical performance of the positive electrode material was evaluated by using a 2032-type button cell. The positive electrode material had an initial discharge specific capacity of 188 mAh/g at 1 C and had a relatively good rate performance which was 90.89% at 2 C/1 C, 87.43% at 5 C/1 C and 85.24% at 10 C/1 C.

Comparative Example 7

A positive electrode material for a lithium ion battery according to the disclosure having the chemical formula of $Li_{1.1}Ni_{0.5}Co_{0.3}Mn_{0.2}O_2$, as shown in FIG. 1, is in form of secondary particles with a hollow microsphere structure and a shell formed by aggregated primary particles.

The positive electrode material was prepared with the following steps.

(1) $Ni_{0.5}Co_{0.3}Mn_{0.2}(OH)_2$ precursor was synthesized by a co-precipitation method including a nucleation and inner core growth stage and a shell growth stage. Specifically the method included the following steps. First, a mixed metal salt solution having a total metal ion concentration of 2 mol/L was prepared by using sulfates of Ni, Co and Mn with the molar ratio of Ni:Co:Mn=5:3:2. Then, 2 mol/L of sodium hydroxide solution and an aqueous ammonia solution with an ammonium concentration of 5 mol/L were prepared. Pure water was used as the base solution of the reaction kettle, and pH of the base solution in the reaction kettle was adjusted to 12.0 with sodium hydroxide. By adjusting the ammonium concentration to 3 g/L, the mixed metal salt solution, the sodium hydroxide solution and the aqueous ammonia solution were added into the reaction kettle via metering pumps for reaction. The reaction temperature was 55° C., the stirring speed was 400 r/min, pH of the reaction system in the reaction kettle was controlled at 10.0~12.0, and nitrogen was continuously introduced into the reaction kettle during the reaction. The ammonium concentration of the reaction system was controlled at 3 g/L at the nucleation and inner core growth stage until the particle size of the material increased to 2.5 μm, and then the ammonium concentration of the reaction system was adjusted to 25 g/L to allow the shell growing until the particle size increased to 4.5 μm. The precipitate from the reaction was obtained by solid-liquid separating, and the precipitate was subjected to aging, washing and drying to provide $Ni_{0.5}Co_{0.3}Mn_{0.2}(OH)_2$ precursor with the average particle size of 4.5 μm and thickness of shell portion of about 1 μm. The precursor was constituted by a central portion consisted of fine particles and a shell portion consisted of large particles with a particle size larger than that of the fine particles.

(2) An appropriate amount of the above said precursor and lithium carbonate were weighed with a lithium to metal ratio (i.e., a molar ratio of Li to Ni+Co+Mn) of 1.10, and an appropriate amount of $WO_3$ was weighed based on 0.1 wt % of W in the positive electrode material. The above feeds were uniformly mixed and then sintered at a high temperature under a sintering atmosphere of a mixture of oxygen and air, in which the sintering process included a heating platform, a high-temperature platform and a cooling platform, i.e., sintering at 700° C. for 6 hours firstly, then increasing the temperature to 880° C. and holding for 10 hours, last cooling the temperature to 750° C. and holding for 5 hours. After the sintering and cooling to room temperature, the material was sieved to obtain the positive electrode material, $Li_{1.1}Ni_{0.5}Co_{0.3}Mn_{0.2}O_2$, with a hollow structure and doped with W.

The physical and chemical properties of the positive electrode material $Li_{1.1}Ni_{0.5}Co_{0.3}Mn_{0.2}O_2$ were measured. The positive electrode material had the specific surface area of 1.89 m²/g and the average particle size of 4.5 μm. The material was subjected to SEM and cross-sectional SEM observations. The SEM result showed that the material had a secondary spherical structure and the particle size was uniform. The cross-sectional SEM result showed that the positive electrode material was in a form of hollow microsphere secondary particles which had a shell formed by primary particles aggregated by sintering and having a thickness of about 1 μm.

The electrical performance of the positive electrode material was evaluated by using a 2032-type button cell. The positive electrode material had an initial discharge specific capacity of 158.6 mAh/g at 1 C and had a relatively good rate performance which was 99.02% at 2 C/1 C, 95.66% at 5 C/1 C and 92.13% at 10 C/1 C.

The invention claimed is:

1. A preparation method of a positive electrode material for a lithium ion battery, wherein the positive electrode material is represented by $Li_aNi_xCo_yM_zO_2$, wherein $0.96 \leq a \leq 1.35$, $0.3 \leq x \leq 1$, $0 \leq y \leq 0.4$, $0 \leq z \leq 0.4$, $x+y+z=1$, M is one or more selected from Mn, Al, Zr, Mg, W, Ti, Y, La, B and Sr; the positive electrode material is secondary particles with a hollow microsphere structure, and a shell of the secondary particles is formed by aggregating a plurality of primary particles, wherein the preparation method comprises the steps of:
(1) synthesizing a $Ni_xCo_yM_z(OH)_2$ precursor by a co-precipitation method comprising a nucleation and inner core growth stage and a shell growth stage; and wherein the obtained precursor has a central portion consisting of fine particles with a particle size of <0.3 μm and a shell portion consisting of large particles having a particle size larger than that of the fine particles;
(2) mixing the precursor obtained in step (1) with a lithium salt uniformly, and then sintering the mixture to obtain the $Li_aNi_xCo_yM_zO_2$ positive electrode material;
wherein in step (1), synthesizing the $Ni_xCo_yM_2(OH)_2$ precursor by the co-precipitation method comprises the steps of: adding a metal salt solution of Ni, Co and M, an alkaline solution and an aqueous ammonia solution to a reaction kettle containing a base solution for reaction, during which a reaction temperature is 40° C.-60° C., a stirring speed is 100 r/min-1000 r/min, pH of a reaction system is controlled from 8-13, and nitrogen is continuously introduced into the reaction kettle; controlling an ammonium concentration of the reaction system in a range of 7 g/L-15 g/L at the nucleation and inner core growth stage, and in a range of 30 g/L-40 g/L at the shell growth stage for synthesizing the precursor, providing that the ammonium concentration of the reaction system at the shell growth stage is higher than that at the nucleation and inner core growth stage; and subjecting a precipitate obtained from the reaction to solid-liquid separating, aging, washing and drying to obtain the $Ni_xCo_yM_2(OH)_2$ precursor.

2. The preparation method according to claim 1, wherein the metal salt solution is one or more selected from sulfate solution, a nitrate solution, a chloride solution, an acetate solution and a meta-aluminate solution, a total concentration of metal ions in the metal salt solution is 0.05 mol/L-3 mol/L; the alkaline solution is a sodium hydroxide solution and has a concentration of 1 mol/L-10 mol/L; and the ammonium concentration of the aqueous ammonia solution is 3 mol/L-6 mol/L.

3. The preparation method according to claim 1, wherein in step (2), adding the lithium salt in an amount such that a molar ratio of Li to Ni+Co+M is 0.96-1.35, and the lithium salt is one or more selected from lithium carbonate, lithium hydroxide, lithium oxalate and lithium acetate; when mixing the precursor with the lithium salt, an oxide of a doping element which is one or more selected from Al, Zr, Mg, W, Ti, Y, La, B and Sr is additionally added, and the doping element is presented in the positive electrode material in a mass percentage of 0.01 wt %-2 wt %.

4. The preparation method according to claim 1, wherein in step (2), the sintering is performed under a temperature of 500° C.-1000° C. for 6-24 hours with an atmosphere of air or oxygen or a mixture of oxygen and air.

5. The preparation method according to claim 4, wherein a multi-stage temperature-controlled sintering method is used in the sintering, wherein firstly a temperature of 500° C.-700° C. is held for 5-6 hours, secondly the temperature is elevated to 810° C.-1000° C. and held for 8-10 hours, and lastly the temperature is lowered to 700° C.-750° C. and held for 5-8 hours.

6. A preparation method of a positive electrode material for a lithium ion battery, wherein the positive electrode material is represented by $Li_aNi_xCo_yM_zO_2$, wherein $0.96 \leq a \leq 1.35$, $0.3 \leq x \leq 1$, $0 \leq y \leq 0.4$, $0 \leq z \leq 0.4$, $x+y+z=1$, M is one or more selected from Mn, Al, Zr, Mg, W, Ti, Y, La, B and Sr; the positive electrode material is secondary particles with a hollow microsphere structure, and a shell of the secondary particles is formed by aggregating a plurality of primary particles; the secondary particles have an average particle size of 0.1 μm-40 μm and a specific surface area of 0.1 m2/g-15.0 m2/g; the primary particles have a particle size of 0.1 μm-3.5 μm; and a ratio of a thickness of the shell of the secondary particles to the particle size of the secondary particles is 1%-49%, wherein the preparation method comprises the steps of:
(1) synthesizing a $Ni_xCo_yM_z(OH)_2$ precursor by a co-precipitation method comprising a nucleation and inner core growth stage and a shell growth stage; and wherein the obtained precursor has a central portion consisting of fine particles with a particle size of <0.3 μm and a shell portion consisting of large particles having a particle size larger than that of the fine particles;
(2) mixing the precursor obtained in step (1) with a lithium salt uniformly, and then sintering the mixture to obtain the $Li_aNi_xCo_yM_zO_2$ positive electrode material;
wherein in step (1), synthesizing the $Ni_xCo_yM_2(OH)_2$ precursor by the co-precipitation method comprises the steps of: adding a metal salt solution of Ni, Co and M, an alkaline solution and an aqueous ammonia solution to a reaction kettle containing a base solution for reaction, during which a reaction temperature is 40° C.-60° C., a stirring speed is 100 r/min-1000 r/min, pH of a reaction system is controlled from 8-13, and nitrogen is continuously introduced into the reaction kettle; controlling an ammonium concentration of the reaction system in a range of 7 g/L-15 g/L at the nucleation and inner core growth stage, and in a range of 30 g/L-40 g/L at the shell growth stage for synthesizing the precursor, providing that the ammonium concentration of the reaction system at the shell growth stage is higher than that at the nucleation and inner core growth stage; and subjecting a precipitate obtained from the reaction to solid-liquid separating, aging, washing and drying to obtain the $Ni_xCo_yM_2(OH)_2$ precursor.

7. The preparation method according to claim 6, wherein the metal salt solution is one or more selected from sulfate solution, a nitrate solution, a chloride solution, an acetate solution and a meta-aluminate solution, a total concentration of metal ions in the metal salt solution is 0.05 mol/L-3 mol/L; the alkaline solution is a sodium hydroxide solution and has a concentration of 1_mol/L-10 mol/L; and the ammonium concentration of the aqueous ammonia solution is 3 mol/L-6 mol/L.

8. The preparation method according to claim 6, wherein in step (2), adding the lithium salt in an amount such that a molar ratio of Li to Ni+Co+M is 0.96-1.35, and the lithium salt is one or more selected from lithium carbonate, lithium hydroxide, lithium oxalate and lithium acetate; when mixing the precursor with the lithium salt, an oxide of a doping element which is one or more selected from Al, Zr, Mg, W, Ti, Y, La, B and Sr is additionally added, and the doping element is presented in the positive electrode material in a mass percentage of 0.01 wt %-2 wt %.

9. The preparation method according to claim 6, wherein in step (2), the sintering is performed under a temperature of 500° C.-1000° C. for 6-24 hours with an atmosphere of air or oxygen or a mixture of oxygen and air.

10. The preparation method according to claim 9, wherein a multi-stage temperature-controlled sintering method is used in the sintering, wherein firstly a temperature of 500° C.-700° C. is held for 5-6 hours, secondly the temperature is elevated to 810° C.-1000° C. and held for 8-10 hours, and lastly the temperature is lowered to 700° C.-750° C. and held for 5-8 hours.

* * * * *